Nov. 25, 1930.   H. HACKETT ET AL   1,782,611
MANUFACTURE OF CARDBOARD BOXES
Filed Sept. 16, 1929   12 Sheets-Sheet 1

INVENTORS:
H. Hackett &
A. Whittaker

By: Marks & Clerk
ATT'YS.

Nov. 25, 1930.  H. HACKETT ET AL  1,782,611
MANUFACTURE OF CARDBOARD BOXES
Filed Sept. 16, 1929   12 Sheets-Sheet 5

INVENTORS;
H. Hackett &
A. Whittaker
By: Marks & Clerk
ATTYS

Nov. 25, 1930.   H. HACKETT ET AL   1,782,611
MANUFACTURE OF CARDBOARD BOXES
Filed Sept. 16, 1929    12 Sheets-Sheet 12

INVENTORS
H. Hackett &
A. Whittaker
By: Marks & Clerk
Attys.

Patented Nov. 25, 1930

1,782,611

UNITED STATES PATENT OFFICE

HENRY HACKETT, OF SELLY OAK, BIRMINGHAM, AND ARTHUR WHITTAKER, OF NORTHFIELD, BIRMINGHAM, ENGLAND

MANUFACTURE OF CARDBOARD BOXES

Application filed September 16, 1929, Serial No. 393,055, and in Great Britain December 31, 1928.

A well known method of making cardboard boxes consists in the use of a single main piece of material which forms the bottom of the box and has its ends adapted to be folded up at right angles to form the ends of the box, and a pair of shorter separate side pieces which are secured to opposite edges of the main piece by strips of gummed paper or fabric to form the sides of the box. The assembling of the parts to form a box is usually carried out on separate machines by a process involving several operations. In the first place, each side piece is attached at right angles to the main piece by a strip of gummed paper of about the same length as the side piece, the side pieces being attached successively in the same machine. In the second place the ends of the main piece are folded up and their edges are secured to the edges of the side pieces by other gummed strips separately applied in successive operations.

The manufacture of boxes in accordance with the above procedure is comparatively slow and costly.

The object of the present invention is to expedite the manufacture of boxes of a similar kind to those above described, and thereby effect manufacturing economies whilst at the same time maintaining the necessary standard of quality.

The invention comprises a sequence of operations performed in a single machine, or mechanically correlated group of machines, in which the edges of the two side pieces are first secured to the main piece by gummed strips which extend the whole length of the main piece, portions of the gummed strips which overhang the edges of the main piece after the side pieces have been attached being utilized to secure the edges of the folded portions in the subsequent folding operation.

In particular the invention comprises the following sequence of operations, (a) bringing a pair of cardboard or like side pieces and a main piece into the proper relative positions in the same horizontal plane, (b) securing the side pieces to the main piece by adhesive strips which extend the whole length of the main piece and overhang parts of the said piece, (c) subjecting the main and side pieces and the adhesive strips to pressure for effecting proper attachment of the strips, and (d) folding the side pieces and end parts of the main piece and securing these edges together by overhanging portions of the adhesive strips.

Also the invention comprises a machine having the features hereinafter described.

We desire it to be understood that the term box refers principally to the body part, but when the box is provided with a lid which is made in a similar manner to the body part, the term box applies to either part.

Referring to the twelve accompanying sheets of explanatory drawings:—

Figure 4:
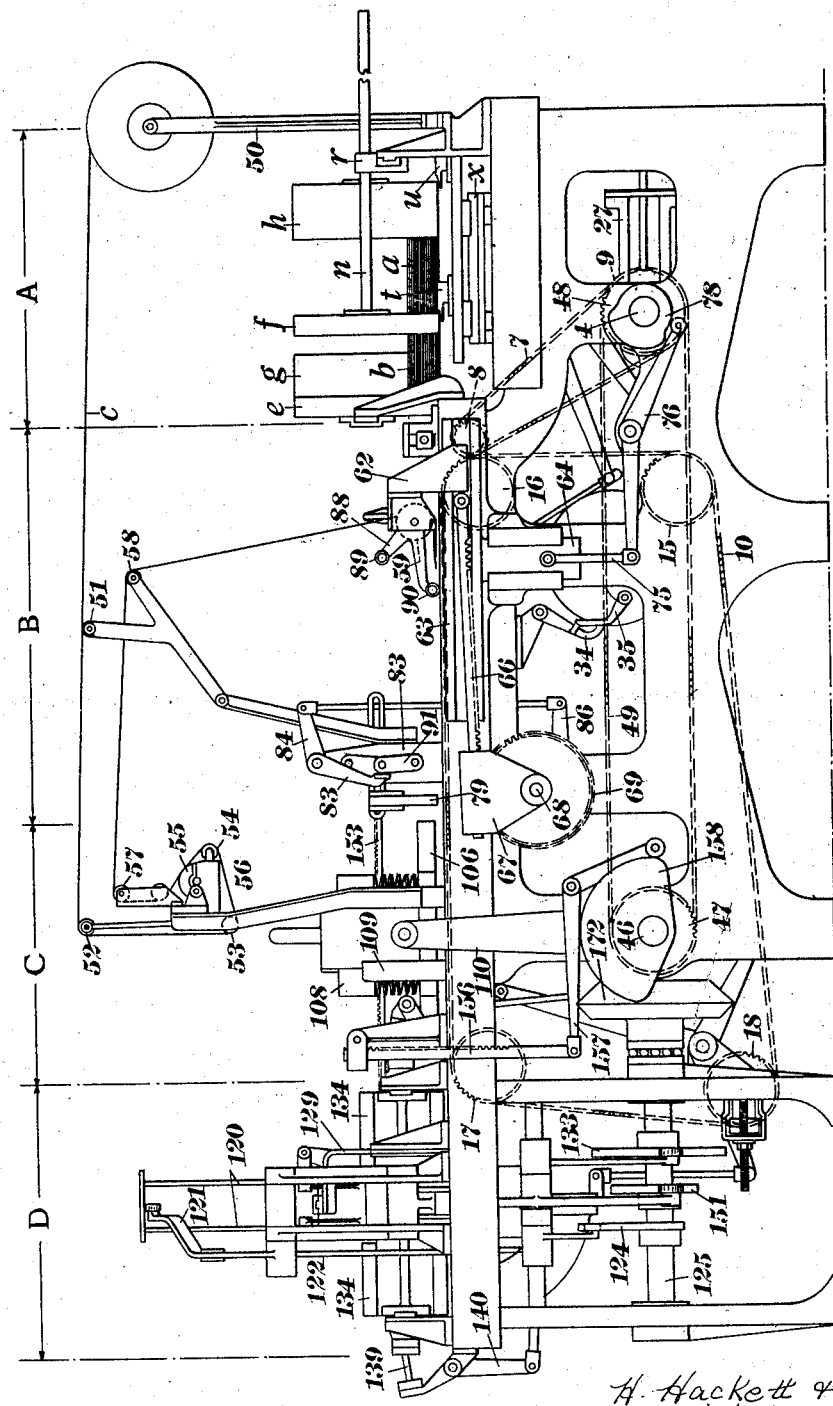
Figure 4 is a side elevation of a machine constructed for use with this invention for the formation of boxes from cardboard or like pieces as shown in Figures 1–3.
Figure 5:
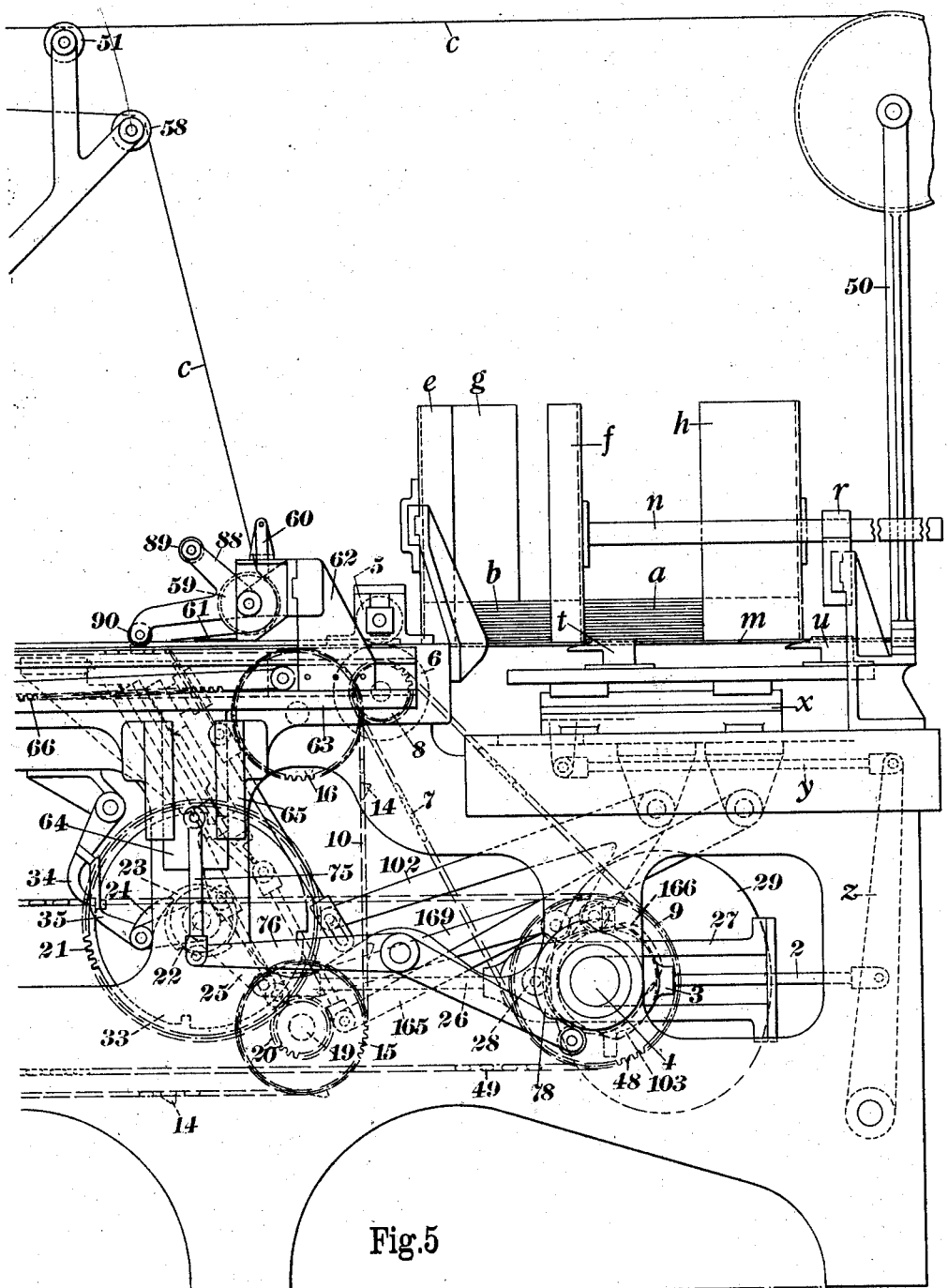
Figures 5, 6 and 7 are respectively side elevation, cross section and plan of the portion of the machine indicated at the right hand end of the machine shown in Figure 4.
Figure 8:
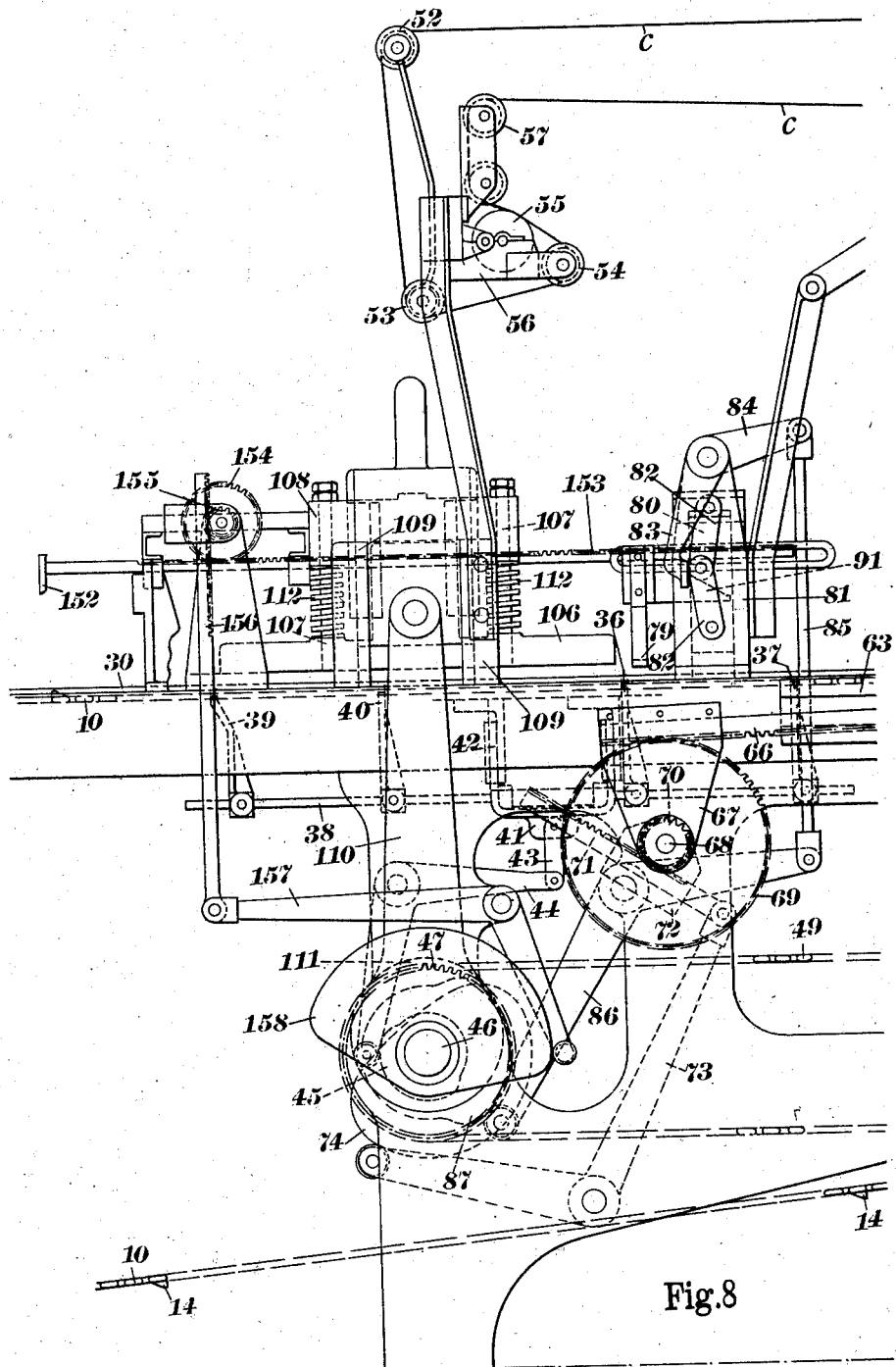
Figure 9:
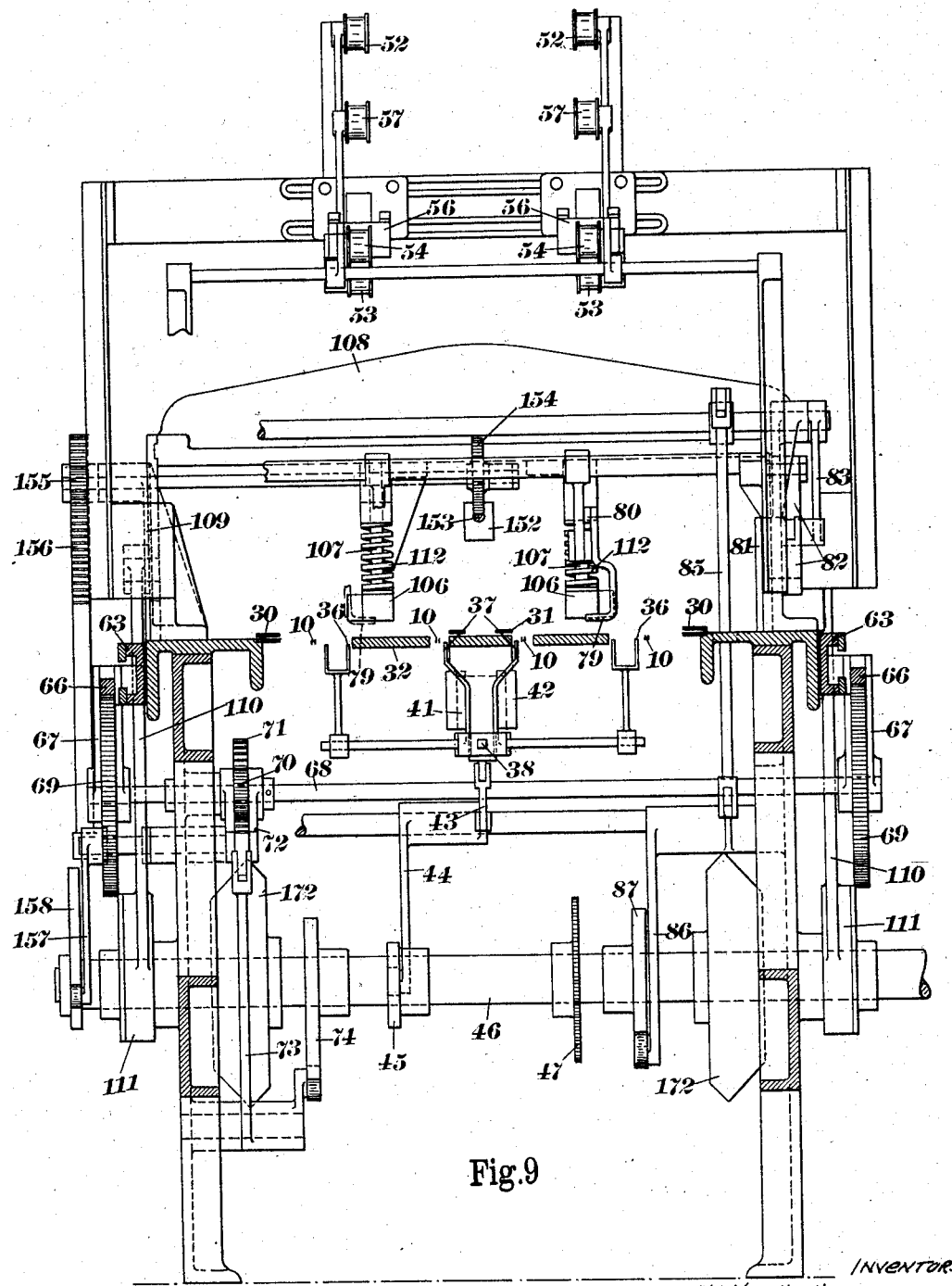
Figure 10:
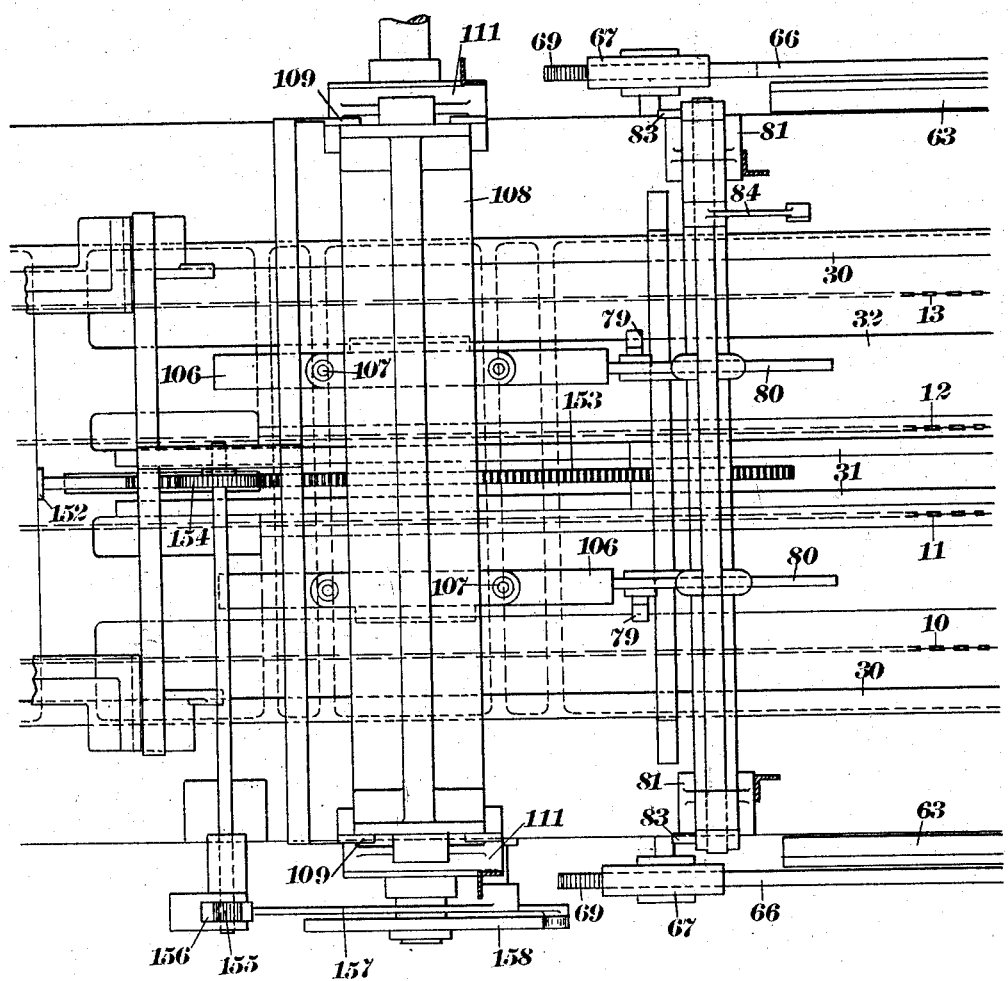
Figure 11:
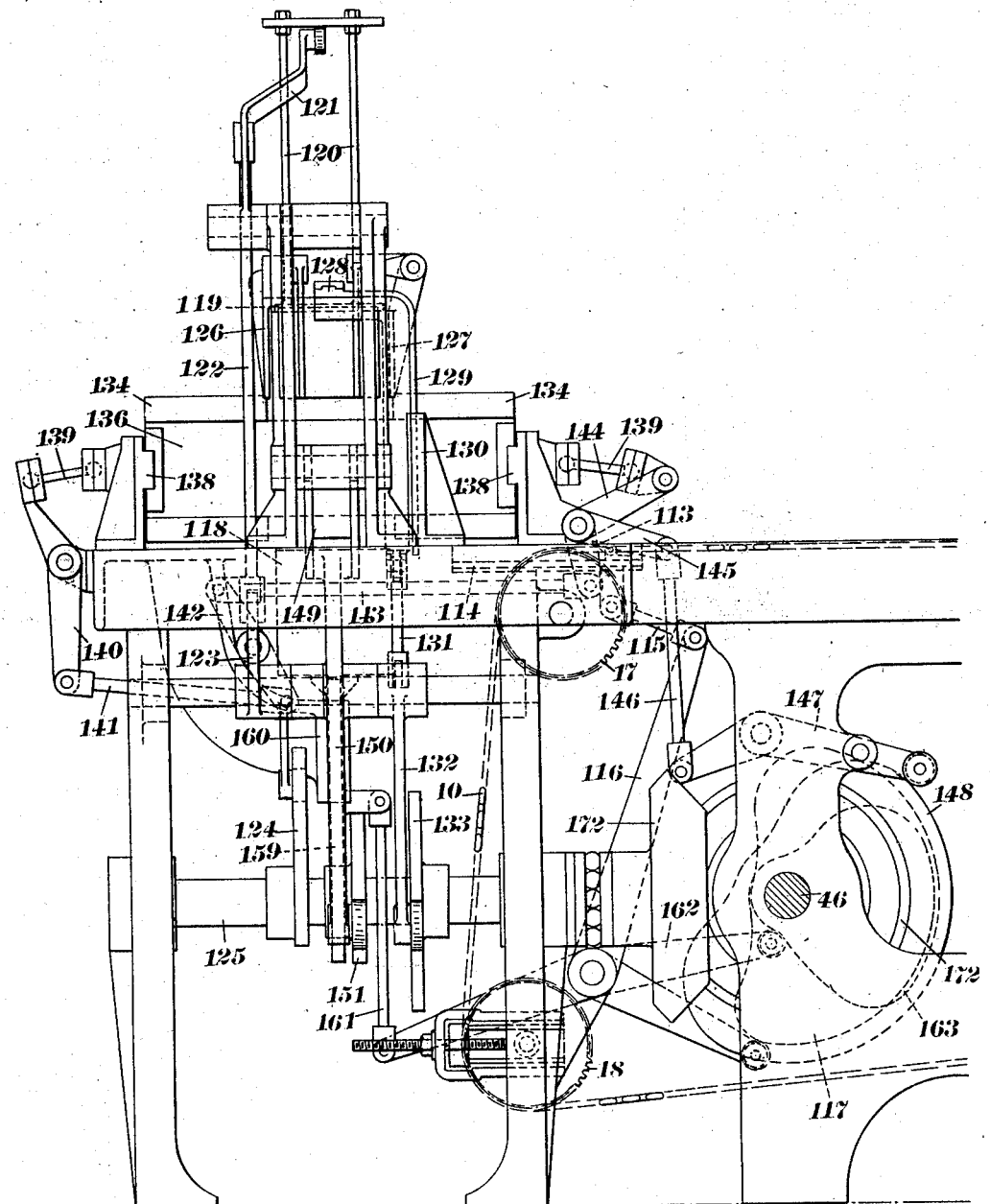
Figure 12:
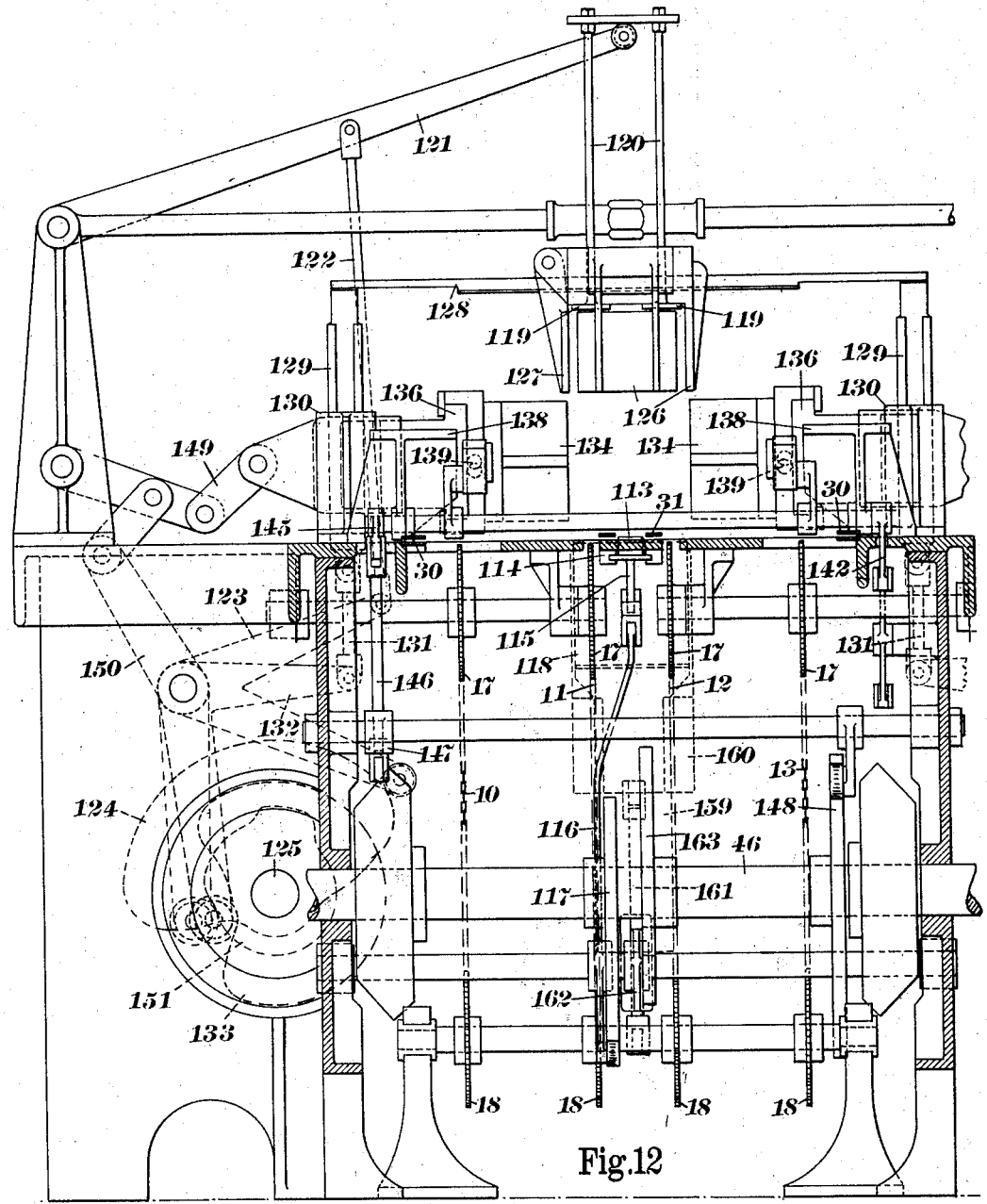
Figure 13:
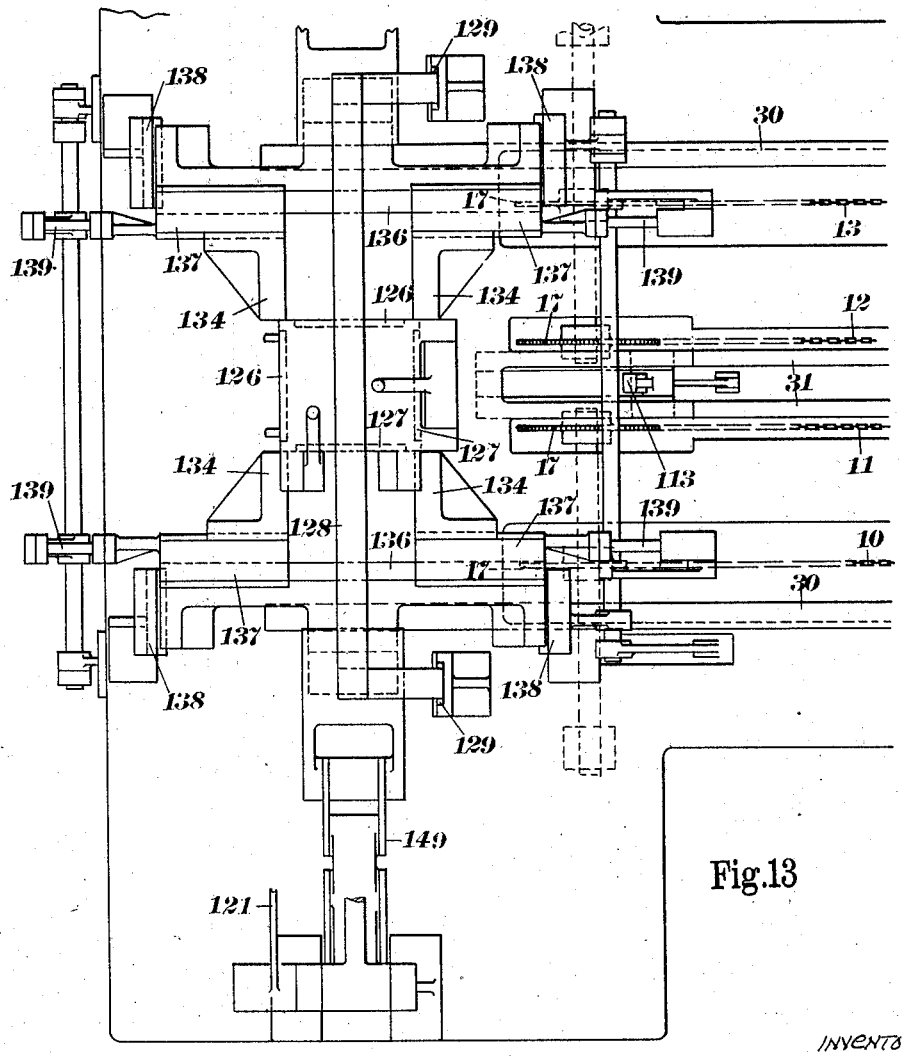

Figures 8, 9 and 10 are respectively side elevation, cross section and plan of the intermediate portion of the machine, whilst Figures 11, 12 and 13 are respectively side elevation, cross section and plan of the left hand portion of the machine shown in Figure 4. The side elevations shown in Figures 5, 8 and 11 are so drawn that when placed side by side they illustrate the whole of the machine to a larger scale than Figure 4.

Figure 15:
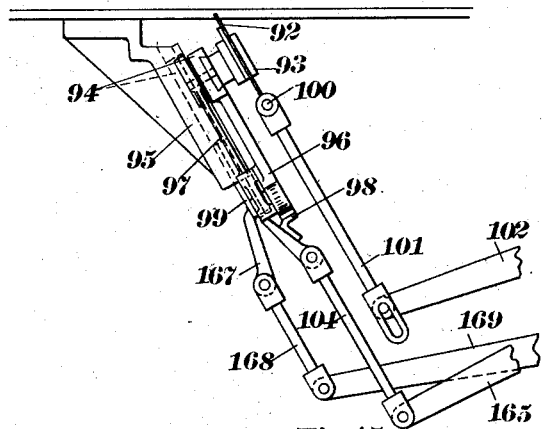
Figure 14:
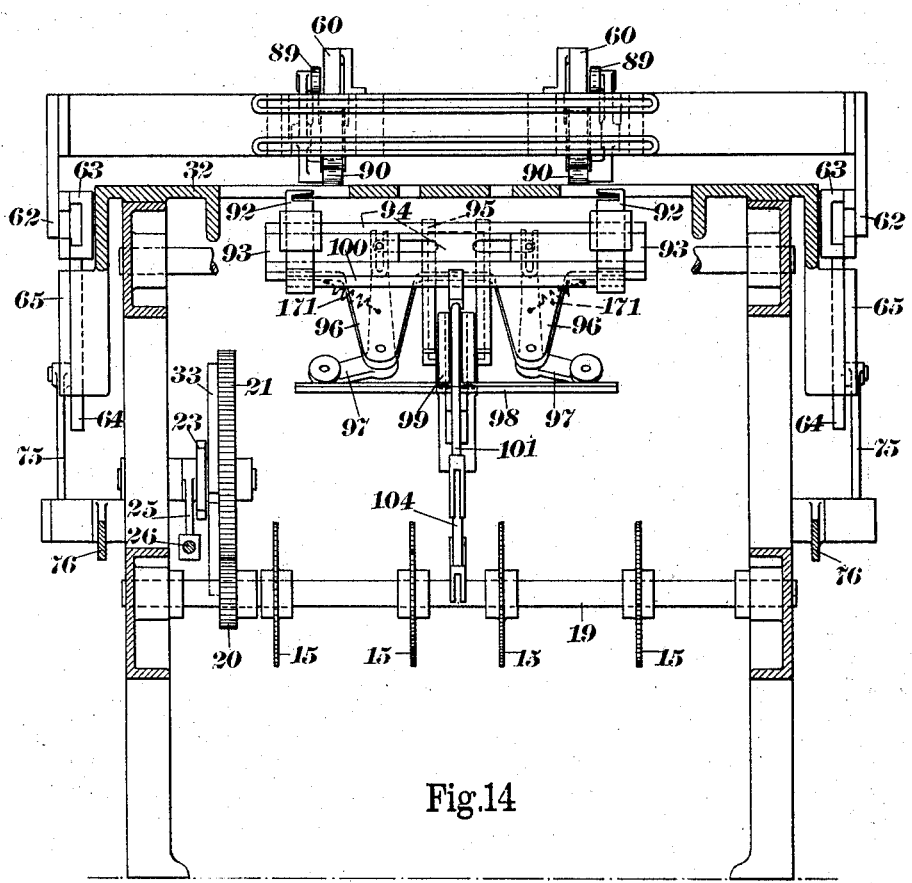

Figure 14 is a cross section showing the principal portion of the paper strip severing mechanism and Figure 15 is a side elevation of such mechanism.

Figure 1:
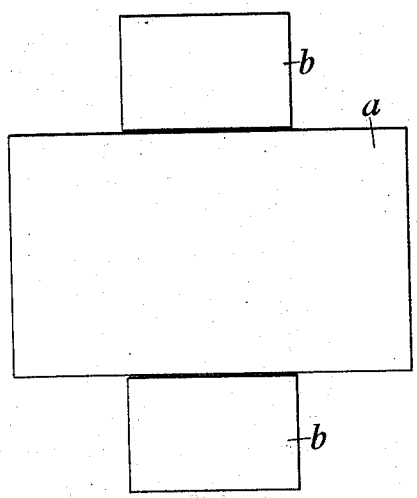
Figure 1 is a plan showing three cardboard or like strips in the relative positions which they occupy prior to the application of the gummed paper strips.
Figure 2:
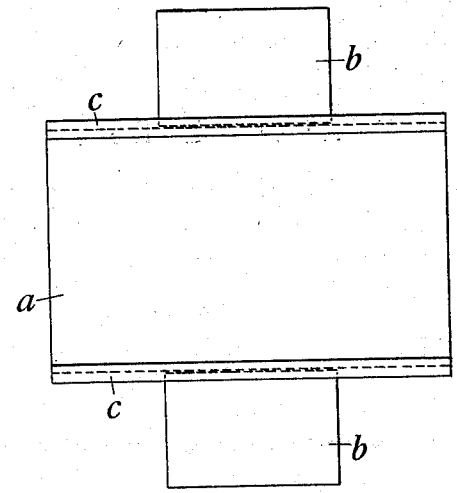
Figure 2 shows the gummed paper strips in position.
Figure 3:
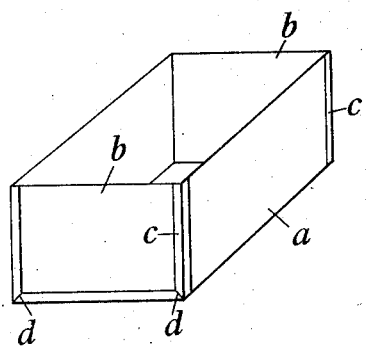
Figure 3 is a perspective view of the finished box.

Before describing the machine, we will, by reference to Figures 1–3, described the process by which a cardboard box is made in accordance with this invention. In the construction of the box, three pieces are used, namely, a long piece *a* and two short pieces *b* as shown in Figure 1. The long piece *a* forms the bottom and two ends of the box, and the shorter pieces *b* form the two sides. The three pieces are first brought into the relationship shown in Figure 1, and while in this position they are connected together by two strips of gummed paper *c* as shown in Figure 2. Each strip is gummed on its underside and is placed along the entire length of the part *a* as shown in Figure 2. Each strip adheres along its entire length to the part *a* and along a part of its length to the adjacent part *b*, but on each side of *b* a portion of the gummed strip is left overhanging as shown. Subsequently the gummed strip is pressed tightly against the parts *a* and *b* to insure secure adhesion and finally the parts thus connected together are placed in a folding mechanism. In this operation, the adjacent edges of the parts *a* and *b*, which in Figure 2 are at right angles to each other, are brought together and the overhanging parts of the strip *c* now overlap the adjacent edges of the parts *b*. Such overhanging edges are, at the completion of this operation, pressed tightly against the parts *b* and the box is thereby completed. Figure 3 shows in perspective a completed box, and the parts above described will therein be readily identified. The two ends and bottom of the box are formed by the part *a* and the two sides by the parts *b*. The parts *a* and *b* are joined together by the strip *c*. In the folding operation and in the pressing of the overhanging portion of the strip *c* against the outer sides of the parts *b*, a tuck is formed in the strip at each of the bottom corners *d* of the box as shown in Figure 3, but it will be understood that each strip *c* extends along a pair of vertical edges and a bottom edge of the box as shown in Figure 3.

In Figure 4 of the accompanying drawings we have shown the side elevation of a machine constructed in accordance with this invention for carrying out the above described sequence of operations. In this machine there are four distinct sections which are indicated by the reference letters A, B, C, D. In section A, the cardboard pieces to be used in the manufacture of the boxes are placed in stacks on the base of the machine. From this position the pieces are moved forward automatically, in a manner to be hereinafter described, to section B where the three pieces forming the box are properly correlated and the gummed strips *c* are placed in position. From section B the three pieces *a*, *b* now joined together by the strips *c*, are advanced to section C where pressure is applied for insuring proper adhesion of the strips *c* to the parts *a*, *b*. Finally, the pieces move forward to section D where the folding operation is performed. After folding, the finished box is delivered from the machine and taken away.

Figure 6:
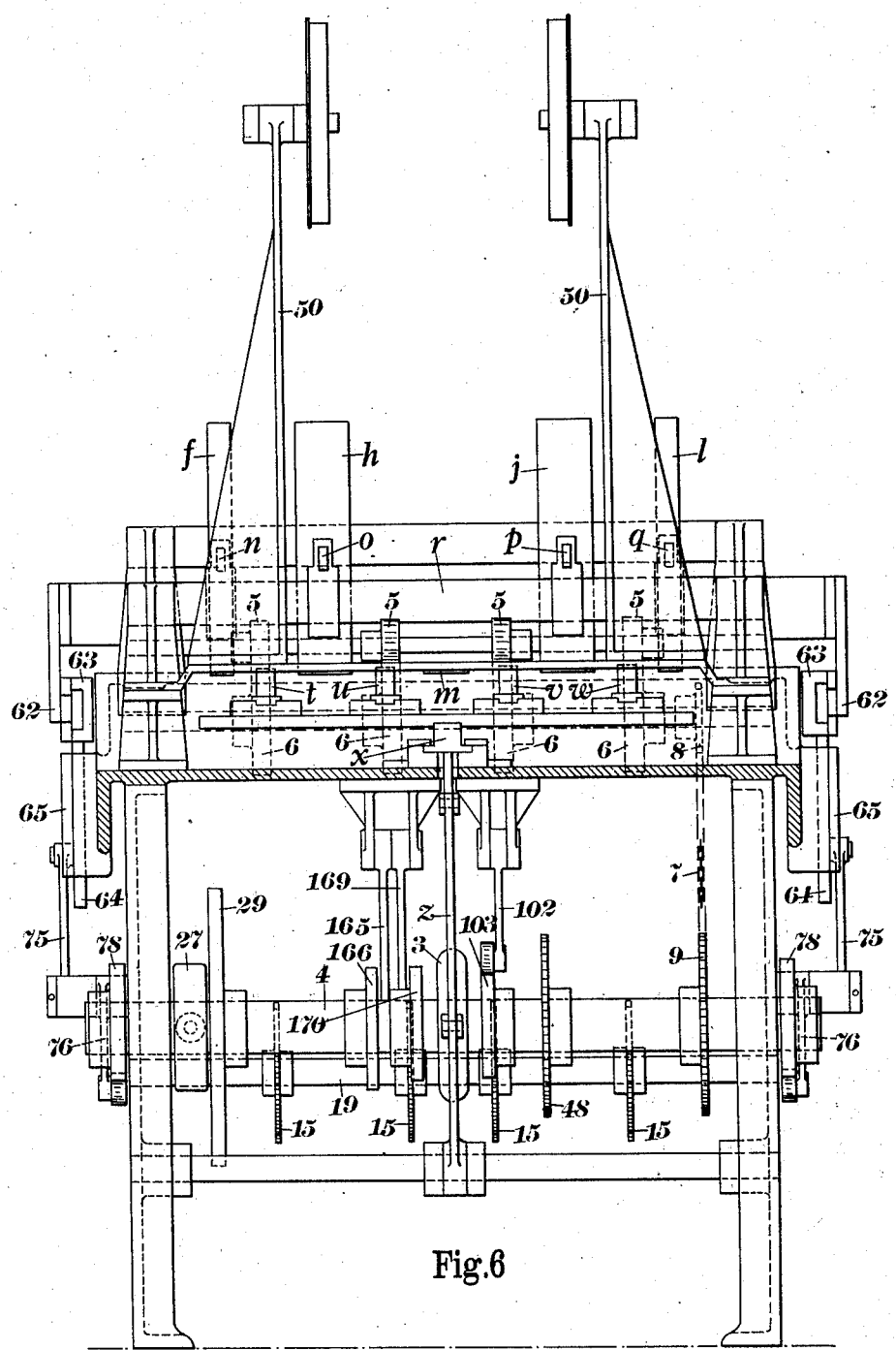
Figure 7:
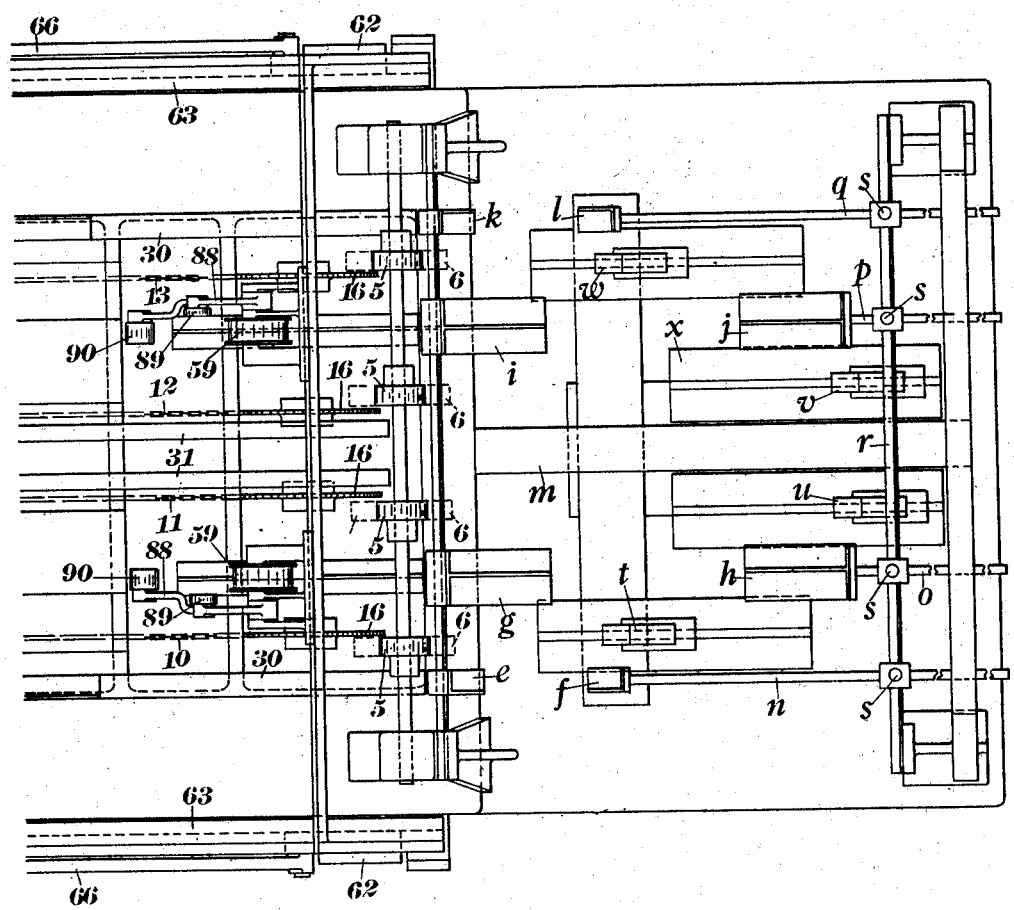

We will now proceed to describe in detail the mechanism employed in each of the four sections above mentioned. Starting with section A, and referring to Figures 5, 6 and 7, two stacks of small cardboard sheets *b* and one stack of large cardboard sheets *a* are supported on the bed of the machine by stationary guides formed by angle members *e, f, g, h, i, j, k, l*. One set of small sheets *b* are held at three corners by the angle members *e, f, g*. The opposite set of small sheets are held at three corners by angle members *i, k, l*. The large sheets are supported at the corners by the angle members *g, h, i, j*, and also by a bottom strip *m*. The members *f, h, j, l* are adjustable relatively to the others by means of bars *n, o, p, q* carried in a cross bar *r* and secured by screws *s*. Each of the angle members above mentioned is formed with a foot at its lower end on which the stack of cardboard sheets rests, but the members *e, g, i, k* immediately above the bottom or foot are formed with a slot through which the bottom sheet can be pushed in a forward direction. The feeding of the individual cards from each stack in the forward direction is effected by slidable pushers *t, u, v, w*, mounted on a slide *x* which is actuated through a link *y*, lever *z*, rod 2 from an eccentric 3 on the shaft 4. When the slide *x* moves in the forward direction, the two pushers *t, w* act upon the bottom piece in the stack of smaller cardboard sheets *b*, whilst the two pushers *u, v*, act upon the bottom piece in the stack of larger cardboard sheets *a*. During such forward movement, the bottom piece from each stack is pushed forward between rapidly rotating rollers 5, 6 driven by a chain 7, sprocket wheels 8, 9 from the shaft 4. As soon as the forward ends of the bottom pieces are caught by the rollers 5, 6, they are advanced rapidly by the rollers into positions from which they can be carried by other mechanism to the next stage in the cycle of operations. This stage is illustrated partly by Figures 5, 6 and 7 and partly by Figures 8, 9 and 10. At suitable positions on the bed of the machine are arranged conveyor chains 10, 11, 12, 13. Each of such chains is provided at suitable positions with projections 14 adapted to engage the rear edges of the cardboard pieces. These chains pass over pulleys 15, 16, 17, 18 and are driven simultaneously in the following manner. On the shaft 19 of the wheels 15 there is provided a gear wheel 20, engaged by a larger wheel 21 on the spindle 22. This spindle carries a ratchet wheel 23 which can be engaged by a pawl 24 actuated by a lever 25 from a rod 26 connected to an oscillatory slotted member 27 provided with a roller 28 which can be engaged by a cam 29 on the shaft 4. To limit accurately the amount of movement given to the chains by the ratchet and pawl mechanism in each operation, the shaft 22 is provided with a notched stop plate 33 which is engaged by a locking pawl 34 which can fall under its own weight into engagement with any of the notches in the stop plate 33. The pawl is raised out of action by a trip piece 35 connected with the pawl 24. When the pawl 24 reaches the end of each operative movement, the locking pawl 34 is free to engage the disc 33 and when the pawl 24 approaches the end of its idle movement the part 35 raises the pawl 34 out of action. The amount of movement given to the chains in each operation is sufficient to carry the cardboard pieces to the proper position in the second stage of the cycle of operations, and the projections 14 on the different chains are so placed that the pieces $b$ are brought to rest at the centre of the piece $a$ as shown in Figure 1. It will be understood that when the pieces $a$, $b$ are fed forward by the rollers 5, 6, their rear edges all occupy about the same line. Owing to the relative disposition of the projections 14 on the different chains, the projections which operate the pieces $b$ engage those pieces rather earlier than the projections which operate the piece $a$, so that the pieces may be brought into proper relative positions.

During the forward movement of the pieces $a$, $b$, under the action of the projections 14, the longitudinal edges of the said pieces pass along guides 30, 31 by which they are held down on the bed 32 of the machine.

To insure accurate positioning of the cardboard pieces and to avoid risk of their moving independently of the chains under momentum, we arrest the pieces $a$, $b$, in the correct positions by means of stops 36, 37. These are carried on a longitudinal bar 38 to which a rising and falling movement can be given for the purpose of raising or lowering the upper ends of the stops 36, 37. The said bar 38 also carries in advance of the stops 36, 37 another pair of stops 39, 40, which are used in the next stage and are referred to hereafter. The bar 38 is carried by a bracket 41 which can slide in guides 42. Vertical motion is given to the bracket 41 by a link 43 and lever 44 which co-operates with a cam 45 on the main shaft 46. This shaft is connected and transmits motion to the shaft 4 already referred to by sprockets 47, 48 and chain 49.

The gummed strips $c$ are in the form of coils carried at the upper ends of supports 50. Each strip is carried forward from the upper side of the coil over an intermediate supporting roller 51 and an end guide roller 52. From this roller the strip descends and after passing around guide rollers 53, 54 is carried over a moistening roller 55 which runs in a water bath 56. Thence the strip passes over rollers 57, another intermediate roller 58, down to a roller 59 in combination with which is arranged a gripping member 60. As shown in the drawing, the strip is caused to pass through a relatively long path between the parts 57 and 59 in order that the moistened adhesive may be allowed to become sufficiently tacky or sticky to enable it to adhere readily to the cardboard pieces. After passing beneath the roller 59, the forward end of the strip is supported on a metal blade 61. The roller 59 is carried on a slide 62 which can move horizontally along the guide 63. This guide is provided at its underside with a vertical extension 64 which can slide between guides 65 fixed on the bed of the machine. The slide is moved along the guide 63 by a rack 66 which passes through a bracket 67 pivoted on the shaft 68 of a gear wheel 69 which engages the rack. The wheel 69 is intermittently rotated by the engagement with gear wheel 70 on the shaft 68 by a rack 71 carried by a bracket 72 pivoted on the shaft 68, and the rack 71 is operated by a bell crank lever 73 which receives its motion from a cam 74 on the shaft 46. Before the slide 62 is moved forward from the position shown in Figures 4 and 5 for the purpose of advancing the forward end of the strips $c$, it is first raised slightly to avoid contact of the forward ends of the strips with the cardboard pieces on the bed of the machine. This motion is effected through the medium of a link 75 and lever 76 from a cam 78 on the shaft 4. By the forward movement of the slide 62 along the guide 63, the forward end of the paper strip is advanced until it reaches a gripper 79.

The gripper 79 (of which there are two situated in line with each of the two paper strips), is carried by a slide 80 which can move vertically in the guide 81. This movement is effected by a pair of toggle links 82, the lower one of which is pivoted to the guide 81 whilst the upper end of the upper one is free to slide in a slot in the guide and is attached to the slide 80. On the centre joint of the toggle there acts a lever 83 which is connected by a lever 84, link 85 to a lever 86 which is acted on by a cam 87 on the shaft 46. In one movement of the lever 83 the toggle mechanism is straightened and this causes the gripper 79 to rise clear of the table. In the opposite movement the toggle is released and the gripper can fall on to the table by gravity. In combination with the roller 59 on the part 62 is arranged a lever 88 carrying a lifting roller 89 and a pressure roller 90 over each strip. Seeing that it is necessary for the forward end of the strip to pass beneath the gripper 79, it will be apparent that before this can be done the roller 90 must be lifted. This is effected by arranging on the slide 80 a wedge 91 which can be engaged by the upper roller 89 on the lever 88. By the interaction of the wedge 91 and the roller 89, the lever 88 is rocked, causing the roller 90 to rise. Also the lower end of the gripper 79 is cranked to allow the roller 90 to pass it. The forward end of the paper strip can now come beneath the gripper. On the descent of the gripper the forward end of each paper strip and the centre cardboard piece *a* are held between the gripper and the table. During the return of the part 62 the roller 89 passes down the inclined edge of the wedge thus allowing the roller 90 to come into contact with the strip, the roller 90 serving during the return movement of the part 62 to press the strip tightly into contact with the adjacent parts of the cardboard pieces *a*, and *b*. During such movement of the part 62 the paper strip is stationary. When the part 62 reaches the initial position shown in Figure 4, the two paper strips are severed.

Adjacent to each paper strip there is arranged a gapped cutting knife 92 which is carried on a slide 93. This slide is capable of moving in a horizontal direction on another inclined slide 94 which is capable of moving in an upward and downward direction on a guide 95. On a pair of extensions 96 on the slide 94 are pivoted a pair of bell crank levers 97 which at one end engage the slides 93 and at the other end engage a cross bar 98. The slide 94 also carries a slide 99 which is connected to and carries the cross bar 98. Further the two knives 92 are connected by a cross bar 100. The cross bar 100 is connected by means of a link 101 to a lever 102 which is actuated by a cam 103 on the shaft 4. The cross bar 98, and the slide which carries it, are connected by a link 104 to a lever 165 which is actuated by a cam 166 on the shaft 4. The lower end of the portion of the slide 94 which extends along the fixed guide 95 is connected by an extension 167 and link 168 to a lever 169 which is operated by a cam 170 on the shaft 4. Starting with the parts in the relative positions shown in Figures 14 and 15, the slide 94 and the knives 92 move together in an upward direction until the gap in each knife comes opposite the edge of the adjacent strip. Both the slide and the knives now remain at rest while the cross bar 98 acts upon the levers 97 and moves the knives inwards so that the gapped portions of the knives lie across the strips. While in this position, the knives are brought downwards relatively to the paper strips by the action of the above described mechanism on the cross bar 100 thereby severing the strips. While the knives remain stationary, the slide 94 is returned to its original position, and during this movement the cross bar 98 also returns to its original position, allowing the slides 93 to be moved away from each other under the action of springs 171. The mechanism now occupies its initial position.

From the position B, the three pieces *a*, *b* connected together by a pair of gummed strips *c*, are now moved forward by the chains 10 to the position C where pressure is applied to the gummed strips to effect their secure adhesion to the pieces *a*, *b*. The proper location of the cardboard pieces in the position C is effected by the above mentioned stops 39, 40, the pieces *b* being engaged by the stop 40 and the piece *a* by the stop 39.

To effect the required squeezing of the strips *c* we employ a pair of bars 106. These are shaped to exert pressure on such parts of the strips *c* as actually make contact with the pieces *a*, *b*, that is to say, the bars 106 are stepped at each end so as to avoid the imposition of pressure on the overhanging parts of the strips *c*. The bars 106 are carried by rods 107 on a cross head 108 the ends of which can slide vertically between guides 109 at the opposite sides of the machine. Motion is imparted to the cross head 108 by a rod 110 which is actuated by an eccentric 111 on the shaft 46. Between the cross head 108 and the bars 106, springs 112 are placed on the rods 107. These springs serve to limit the pressure which is exerted on the gummed paper strips and cardboard pieces. It will be understood that when the cardboard pieces and strips lie beneath the bars 106 the latter are brought down and caused to exert a pressure which insures secure adhesion between the strips *c* and the pieces *a*, *b*.

From the position last described, the cardboard pieces are again moved forward by the chain to the last position D. The forward movement of the pieces *a*, *b* is effected mainly by the projections 14 on the chain 10, but owing to the mechanism associated with the position D it is not convenient to arrange the chain 10 to complete the movement of the cardboard pieces. The completion is effected by a pawl 113 on a slide 114 which is actuated by a link 115, lever 116 and cam 117 on the shaft 46. As already described the operation which takes place in the stage D is that of folding the ends of the strip *a* and the side strips *b* through a right angle and causing the overhanging portions of the gummed strips *c* to become attached to the edges of the parts *b*. This is effected by the use of folders as follows:—Lying within an aperture in the bed of the machine, and with its upper side flush with the top of the bed, is a rectangular plunger 118 the dimensions of which correspond with the dimensions of the interior of the finished box. The centre of the cardboard piece *a* is first gripped between a pressure piece 119 and the upper side of the plunger 118. The pressure piece is carried by rods 120 and is caused to rise and fall by means of a lever 121, a rod 122, a lever 123 and cam 124 on the shaft 125, the latter being driven by the shaft 46 and bevel wheels 172. Over the plunger there is carried a folder in the form of an inverted box the internal dimensions of which correspond with the external dimensions of the cardboard box to be shaped. The folder comprises two fixed sides 126 and a pair of pivoted sides 127. The whole of this folder is carried on a cross bar 128 which is attached to side rods 129 arranged to slide within guides 130 under the action of links 131, levers 132 and cam 133 on the shaft 125. During the raising of the plunger 118 and the pressure piece 119, the folder is caused to descend so as to press or fold down against the sides of the plunger the parts b and the ends of the part a. The folder leaves the vertical corners of the box exposed so that they may be acted upon by squeezers 134. There are four of these squeezers and each is arranged to receive two movements, one parallel with the length of the machine and the other in a cross-wise direction. The squeezers are arranged in pairs and each pair is carried on a bar 136 through the medium of slides 137 which are capable of moving in opposite directions on the bar 136. Also the ends of the bar are carried on guides 138 to enable the required cross-wise movement of the squeezers to be obtained. After the cardboard pieces have been folded, the squeezers 134 are brought into action for the purpose of folding the overhanging portions of the gummed strips c into contact with the sides of the parts b. The movement of the two squeezers in each pair towards each other on the bar 136 is effected by means of links 139. One of these links is attached to a lever 140 which is connected by a link 141, lever 142, cross rod 143 to a lever 144 connected to the other link 139. The lever 144 receives its motion from a lever 145, link 146, lever 147 and cam 148 on the shaft 46. The movement of each bar 136 carrying a pair of squeezers 134 in the cross-wise direction is effected by a toggle mechanism 149, lever 150, cam 151 on the shaft 125. By the action of the squeezers not only are the overhanging portions of the gummed strips c folded over against the sides of the parts b, but they are also squeezed tightly to insure perfect adhesion. In this folding operation the tuck d at each corner (see Figure 3) is formed quite automatically without the aid of extra mechanism. On the separation of the squeezers and the return of the plunger to its original position, the completed box stands in an inverted position on the table of the machine. The upward and downward movement of the plunger 118 is effected by means of a vertical bar 159 which slides in a guide 160 and is actuated by means of a link 161, lever 162 and cam 163 on the shaft 46.

Ejection of the box from the machine is effected by an ejector 152 carried by a rack 153 which is engaged by a pinion 154, the latter being rotated by a coaxial pinion 155 which is actuated by a vertically moving rack 156 attached to a lever 157 which is actuated by a cam 158 on the shaft 46.

It will be understood that while the machine is working, a constant succession of cardboard pieces are passing through the machine, and consequently at any given time there will be a set of pieces a, b in each of the positions A, B, C, D, and that the operations which take place at those stages and which have been described as occurring in sequence take place simultaneously on different pieces a, b. We desire it to be understood that the essential features of our invention reside in the mechanisms which come into direct contact with the cardboard pieces a, b and the gummed strips c, and that the various cams and levers which operate those parts are subordinate and may readily be varied. Where reference has been made to cams, these may be adapted to impart positive movements in both directions to the mechanical elements which they act upon, or they may impart positive motion in one direction only, the return movements being effected by gravity or by weights or springs.

Having thus described our invention what we claim as new and desire to secure by Letters Patent is:—

1. In a machine for the manufacture of boxes from a main piece and two shorter side pieces of cardboard or like material, means whereby the said pieces are correlated on a horizontal table so that the side pieces lie centrally with respect to opposite sides of the main piece, means whereby two adhesive flexible strips are attached to the said pieces, leaving overhanging portions, and means whereby the side pieces and the ends of the main piece are folded and the said overhanging portions of the adhesive strips are caused to secure the folded portions, substantially as described.

2. In a machine for the manufacture of cardboard boxes, means for effecting the following sequence of operations, (a) bringing a pair of cardboard or like side pieces and a main piece into the proper relative positions in the same horizontal plane, (b) securing the side pieces to the main piece by adhesive strips which extend the whole length of the main piece and overhanging parts of the said piece, (c) subjecting the main and side pieces and the adhesive strips to pressure for effecting proper attachment of the strips, and (d) folding the side pieces and end parts of the main piece and securing these edges together by overhanging portions of the adhesive strips, substantially as described.

3. In machines for making boxes from a main piece and two shorter side pieces of cardboard or like material, the combination comprising a horizontal bed, means for supporting a stack of main pieces, and two stacks of shorter side pieces, these latter being situated on opposite sides of the main pieces, means for advancing simultaneously the bottom piece from each stack, means for arranging the side pieces centrally with respect to opposite sides of the main piece, means for advancing the free ends of two adhesive strips over the edges of the main and side pieces, means for attaching the strips to the pieces, a strip severing mechanism, a pressure device acting on the strips, a folding and squeezing mechanism whereby the ends of the main piece and the side pieces are folded through a right angle and overhanging portions of the adhesive strip are caused to secure the folded parts, means for automatically traversing the pieces over the bed of the machine from one operative position to the next, and ejecting mechanism, substantially as described.

4. In machines for making boxes from a main piece and two shorter side pieces of cardboard or like material, the combination comprising a horizontal bed, means for supporting on the bed a stack of main pieces and two stacks of side pieces, these latter being situated on opposite sides of the main pieces, a slide whereby the bottom piece can be removed from each stack, rollers for advancing the removed pieces, a conveyor whereby the pieces advanced by the rollers are properly correlated on the bed of the machine, a horizontally slidable carriage provided with a gripper for the ends of a pair of adhesive strips, a gripper on the bed of the machine whereby the forward ends of the strips can be secured, a roller on the carriage for pressing the strip into contact with the main and side pieces during the return of the carriage, strip severing mechanism, a pressure device whereby the strips are pressed tightly into contact with the main and side pieces, after removal from the position at which the strips are attached, the said removal being effected by the same means as those used to bring the pieces into the initial proper position, folding and squeezing mechanism whereby the side pieces and the ends of the main piece are folded through a right angle and are secured by overhanging portions of the adhesive strips, means for moving the pieces from the pressure position to the folding position, and means for ejecting the finished box, substantially as described.

5. In box making machines as claimed in claim 4, the combination with the strip gripper on the bed of the machine, of means for raising the roller on the carriage clear of the strip during the forward motion of the carriage and allowing the roller to come into contact with the strips in the return motion of the carriage, substantially as described.

6. In box making machines as claimed in claim 4, the combination with the slidable carriage, of rollers around which the adhesive strips pass, means for producing a rising and falling motion of the carriage as well as a horizontal reciprocatory motion, and a support on the carriage for the forward ends of the strips, substantially as described.

7. In box making machines as claimed in claim 4, the combination with the bed of the machine adjacent to the reciprocatory carriage, of strip cutting mechanism whereby notched or like blades are moved upward and downwards and sideways relatively to the adhesive strips, substantially as described.

8. In box making machines as claimed in claim 4, the combination with a vertically movable plunger and pressure piece, of a folder whereby the side pieces and the ends of the main piece are turned down through a right angle, and squeezers adapted to act on the vertical edges of the folded pieces for folding over them the overhanging portions of the adhesive strips and securing the same, substantially as described.

In testimony whereof we have signed our names to this specification.

HENRY HACKETT.
ARTHUR WHITTAKER.